Oct. 27, 1970

J. A. RAWLS, JR., ET AL 3,536,835

AUDITORY SCREENING DEVICE

Filed April 18, 1969

Jack A. Rawls Jr.
H. Wayne Rudmose
INVENTORS

BY Arnold, Roylance,
Kruger & Durkee

ATTORNEYS 3,536,835
AUDITORY SCREENING DEVICE
Jack A. Rawls, Jr., and H. Wayne Rudmose, Austin, Tex., assignors to Tracor, Inc., Austin, Tex., a corporation of Texas
Filed Apr. 18, 1969, Ser. No. 817,433
Int. Cl. H04r 29/00
U.S. Cl. 179—1          11 Claims

ABSTRACT OF THE DISCLOSURE

This invention relates to testing devices intended primarily to be self-operated and to be used to rapidly screen out persons who have an appreciable hearing loss (for later, more comprehensive testing) from those whose hearing is satisfactory. A device includes suitable earphones to be worn by the person being tested, sequentially operated bistable elements for initiating each test step, the rate of step testing being determined by the person being tested as he responds to each sequential test step; a logic circuit for selecting a signal or no-signal occurrence to be supplied to the person being tested; a console with a group of visual indicators for informing at all times the person being tested of the portion of the test cycle then occurring for each test step; oscillators, attenuators and gates for producing in accordance with the preset programmed instructions from the logic circuit the test tones to be applied to the earphones; switches to allow the person being tested to vote in accordance with how the tones are heard by him; and actuators and recorders or indicators for correlating the vote with the actual test occurrences.

BACKGROUND OF THE INVENTION

Field of the invention

This invention pertains to auditory testing devices and more specifically to a screening device needing no supervisor, and which determines quickly if a person's hearing is satisfactory, or is marginal, and therefore the person should be subjected to more extensive testing.

Description of the prior art

Hearing, being a very critical sense, must be satisfactory for persons to participate in many activities. For example, school children are tested merely to determine if they can hear the teacher; military personnel are tested to determine if they are suited for various specific assigned duties; motor vehicle operators are tested to determine if they can safely hear warning road signals and industrial employees are tested to determine if they are capable of performing certain jobs. In fact, since hearing is so important in almost every daily endeavor, almost all routine physical examinations, for whatever purpose the examination may be given, now include a hearing test.

Heretofore, it has been usual to give such an examination via a sound-isolating chamber or through earphones to the person whose hearing is being tested by electromechanically feeding him test tones as controlled by an examining operator at various levels. Through the person's response, as coordinated with the initiated tones, the person's hearing is measured and recorded.

It should be recognized that such a typical test is commonly in the nature of a complete examination, and not merely a screening test.

Such a test also requires a qualified operator for its administration, and the responses need to be also expertly and subjectively analyzed, again by skilled personnel.

Although these devices have controls for tone frequency, volume levels, duration of application and suggested graduated sequences, the effective and efficient administration still is heavily dependent on the skill of the operator. For instance, changing the length of time that a tone is applied actually changes its effect as an auditory stimulus. When these time periods are operator-controlled, the idiosyncrasies of the operator have an effect on the test results. It can be shown that the same subject tested by the same equipment, but controlled in a first test by a first operator and in a second test by a second operator, will test differently on two theoretically identical tests. In summary, the hearing test devices presently in use very much are subject to human subjectivity.

Although, when properly and expertly applied and evaluated, a complete hearing examination given by a device as above described can be satisfactory, such elaborate testing is more than is actually needed in the large number of cases. That is, there has not heretofore been an economical and subject controlled device for screening out persons who need a more complete examination from those who do not. Particularly has this shortage been evident where there is a large-scale program of hearing evaluation or where a large number of persons are examined at the same time, such as in a testing program conducted by a school system.

SUMMARY OF THE INVENTION

The present device does not allow the person being tested to operate the machine without the need of an operator and to complete therewith in a short period of time a satisfactory and economical self-screening test. Moreover, a permanent record of the test may be made, which test record is uniquely marked with an indication of the examinee to whom it pertains. This record may be sorted so that the persons needing more complete hearing examination may be quickly ascertained. Also, such sorting may be either done by mechanical means or by a lower grade skill than is required for an examining operator.

Therefore, a primary object of the present invention is to provide an improved device for determining quickly and economically and, if needed, on a large-scale basis, persons who have a significant hearing loss. The device is not intended normally to determine the extent of such loss. Subsequently, persons identified as having a suspected loss may be subjected to more detailed examination, making an overall evaluation program using the herein-presented device more efficient to administer. In essence, the device separates the persons meeting th standards of the program from those who are suspected of not meeting these standards. In fact, the screening results may be made to classify suspected loss of hearing for each test frequency (the test levels for which can be adjusted over a moderate range and are independent of the test levels for other frequencies).

In summary of the invention, a machine is provided having acoustically sealing earphones for the examinee to wear. The front panel of the machine facing the examinee or person being tested includes a series of lights or other visual indicators preferably marked READY, LISTEN and VOTE and two panel controls, preferably two "vote" buttons marked YES and NO. Also, a slot for inserting a coin or other convenient means for starting the test and identifying the examinee is conveniently located on the machine.

The machine includes a preprogrammed logic circuit and suitable oscillators and attenuators for developing tones at preset volume levels. These circuit elements provide the means for applying tones, not only in planned sequence, but also at predetermined planned levels to the earphones of the person being tested. Also included are a gated selector circuit for actually applying the specific test tones to the earphones; decision circuits operated by the panel controls and suitable gates operating therewith; and "pass" and "fail" actuators, storage and/or recording means.

In taking the test, the tested person first sees the READY light come on, at which time he knows the machine is about to apply a tone or is about to fool him by not applying a tone. Next, the READY light goes out, and the LISTEN light comes on. When the LISTEN light comes on, the person is instructed to listen carefully for the presence of a tone. Next, the LISTEN light goes out and the VOTE light comes on. If the tested person has heard a tone during the prior LISTEN period (while the LISTEN light was on), he is instructed to depress the YES button on the panel. Otherwise, he is instructed to depress the NO button.

If there had been a tone during the period to which the vote pertained, and the person so voted, then a "correct answer" signal is produced by a suitable logic means within the machine to mark a suitable storage and/or a recording means. Also, if there had been no sound during the period, and the person voted by depressing the NO button, a "correct answer" signal is likewise produced.

On the other hand, in either instance, if the wrong-answer button had been depressed, an "incorrect answer" signal is produced for being stored or for marking the recording means.

The examinee generally sets the speed or pace at which the test is given, since after he has "voted" in one individual test step the next individual test is initiated.

A preset number of incorrect answers may be programmed into the machine and made to trigger an enjection system so that, upon completion of the test, the coin deposited to initiate the sequence of tests is deposited in a "fail" compartment in the machine. Otherwise, the coin is deposited in the "pass" compartment. The coin could be initialled, numbered or otherwise identified to indicate the examinee.

Alternately, the recording means may score each of the individual tests in the sequence to form a complete scorecard for the examinee. These cards may be identified by any convenient numbering system as pertaining to the examinee and may be sorted routinely into categories, either by clerk-type help or by automatic machine sorting devices.

It may be seen that among the many operating advantages of the invention are that the device just described requires no complex instructions to the examinee, such as counting the number of pulsed tones, but requires only a simple yes-no vote concerning if a signal occurrence is present or not present; does not rush or "pace" the examinee by an operator; and generally produces an objective test result.

BRIEF DESCRIPTION OF THE DRAWINGS

So that the manner in which the above-described advantages and objects of the invention, as well as others which will become apparent, are attained can be understood in detail, more particular description of the invention briefly summarized above may be had by reference to the embodiment thereof which is illustrated in the appended drawings, which drawings form a part of this specification. It is to be noted, however, that the appended drawings illustrate only a typical embodiment of the invention which is therefore not to be considered limiting of its scope, for the invention may admit to other equally effective embodiments.

In the drawings.

DESCRIPTION OF THE PREFERRED EMBODIMENTS

In the following description, "test" is a term used to identify an individual step involving a stimulus presentation of a signal or no-signal occurrence to the examinee or person relating thereto. The complete sequence of tests is referred to as the "overall test." A stimulus presentation in which a signal is present is referred to as an application of a "test tone." In the tests performed by the device hereinafter described, "test tones" are applied at predetermined constant levels. That is, "test tones" are not applied at a low intensity and increased, as with some operator-controlled devices.

Figures 1, 2, 3:
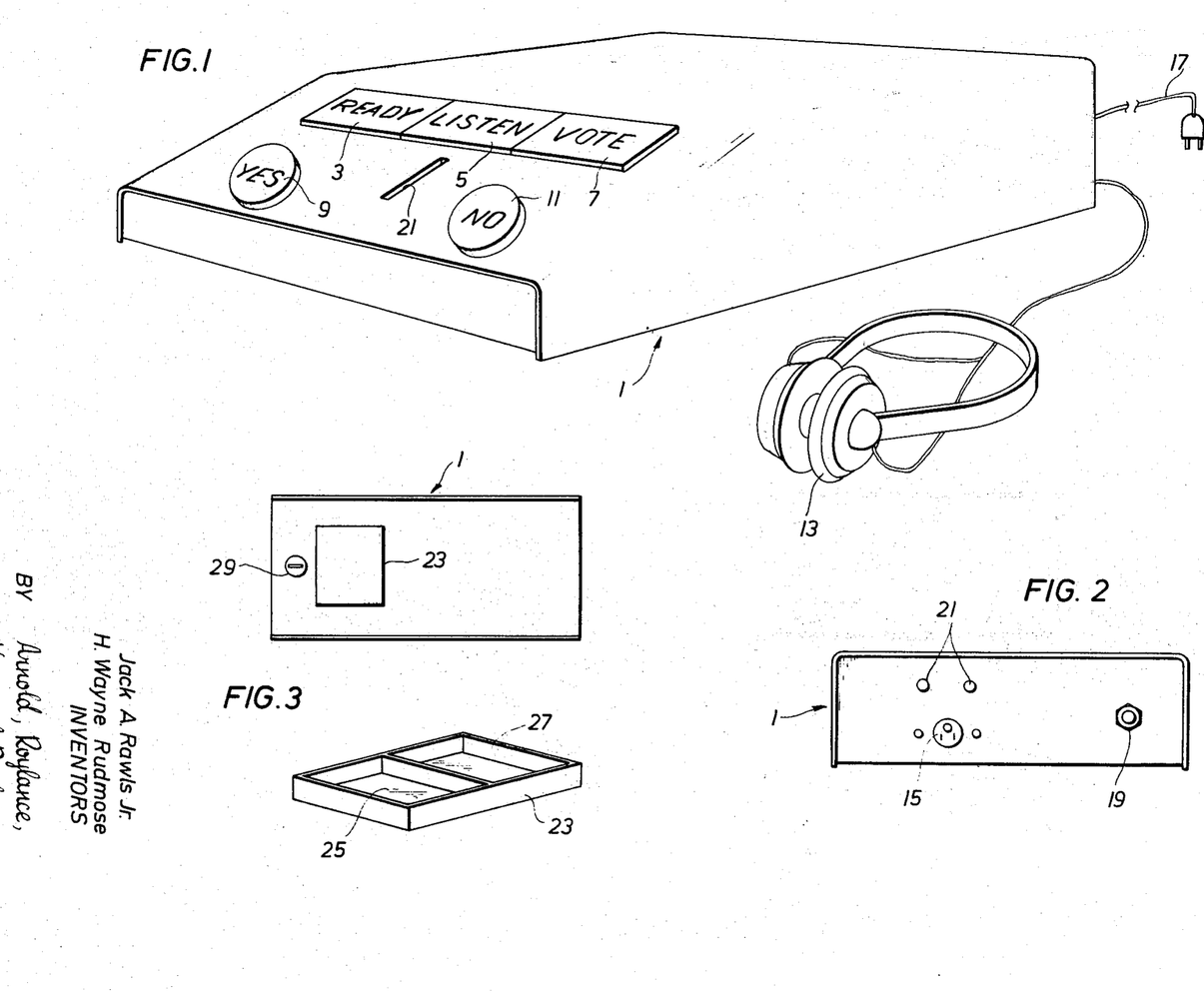
FIG. 1 is an oblique view of the chassis of a preferred embodiment of the invention.
FIG. 2 is a rear view of the embodiment shown in FIG. 1.
FIG. 3 is a bottom view of the embodiment shown in FIG. 1.

Now referring to the drawings and first to FIG. 1, an individual auditory screener 1 is shown for testing the hearing of a person who sits at the screener in a position opposite the slanted front panel of the chassis to review lights 3, 5 and 7, to operate buttons 9 and 11 and to wear headphones 13. As shown in FIG. 2, the rear of screener 1 includes a conventional power plug 15 suitable for receiving power cord 17 and phone jacks suitable for receiving headphones 13, as well as conventional fuses 21.

A better understanding of the functional operation of the invention may be had by first understanding how the overall test sequence is observed and taken by a person being tested. Therefore, before explaining the details of the circuit, the description of the operation which follows is believed to be helpful.

In preparing to receive an auditory screening test, the person whose hearing is to be tested ascertains that power connection is made to the auditory screener and that the headphones are comfortably and suitably situated over the pinuae of the ears until an acoustical seal is attained. The headphones may be of the type indicated to enclose the entire ear, or they may be any convenient type of acoustical or auditory transducer capable of producing audible tones over the spectrum of normal hearing in response to appropriate and corresponding electrical signal and which shields out unwanted noise.

The person who is about to be tested for hearing loss, or the examinee, initiates the first test from the auditory screener by inserting a suitable token on which there is a suitable designation of the examinee into slot 21. READY light 3 illuminates, indicating that a test is about to occur. That is, either a test tone will be heard in the earphones or, alternately, a period of time will elapse in which no tone is heard. The onset of this actual signal or no-signal occurrence occurs when READY light 3 goes out and LISTEN light 5 comes on.

When LISTEN light 5 goes out, VOTE light 7 comes on, and the person whose hearing is being tested responds by depressing YES button 9 if he heard a tone during the LISTEN period or NO button 11 if he did not hear a tone during the LISTEN period.

Upon depressing either YES button 9 or NO button 11, the READY light 3 again illuminates, and the examinee repeats the sequence for the next test. Each time VOTE light 7 comes on, the person whose hearing is being tested votes either "Yes" or "No" in accordance with whether he has heard a tone or not during the time LISTEN light 5 was illuminated. If the examinee fails to vote during the preset "vote" period (which is made suitably long so as not to appreciably interfere with normal procrastination by the subject), a "No" vote is automatically recorded, and the next test presentation begins.

After the completion of the overall test (the conclusion of the sequence of tests for which the device is preprogrammed) the device automatically turns itself off and all the lights remain off. This indicates that the overall test is completed. At that time the subject whose hearing has been tested removes the headphones, and the auditory screener device is ready for the next person.

As may be shown in FIG. 3, the bottom of screener 1 contains a coinbox 23 having a "Pass" compartment 25 and a "Fail" compartment 27. The coin initially inserted into slot 21 by the person whose hearing was tested is deposited into either the "Fail" compartment or the "Pass" compartment upon the conclusion of the test. Since his coin is uniquely identified as being his, such as having his initials inscribed thereon or a number appointed to him inscribed thereon, upon the conclusion of all tests for all the persons who have had their hearing tested by the auditory screener at a particular time, a person having a suitable key for lock 29 unlocks coinbox 23 and sorts the coins in compartments 25 and 27 to appropriately separate those persons who passed the overall test from those who did not.

Alternately, the device may include any other convenient means of permanently recording the overall test results, such as a punched card for showing which of the individual tests the person whose hearing was tested were passed and which were failed. Modifications and supplementary devices may be employed to record and/or process the test results. Some of these are discussed later herein.

Alternatively to the physical construction shown in FIGS. 1-3, the entire unit may be conveniently packaged in a typewriter-sized unit for portable handling. In fact, in addition to accommodating the main electronic console, a suitable carrying case may be made for accepting the headphones, power cords, extra parts, etc.

Figures 4, 5:
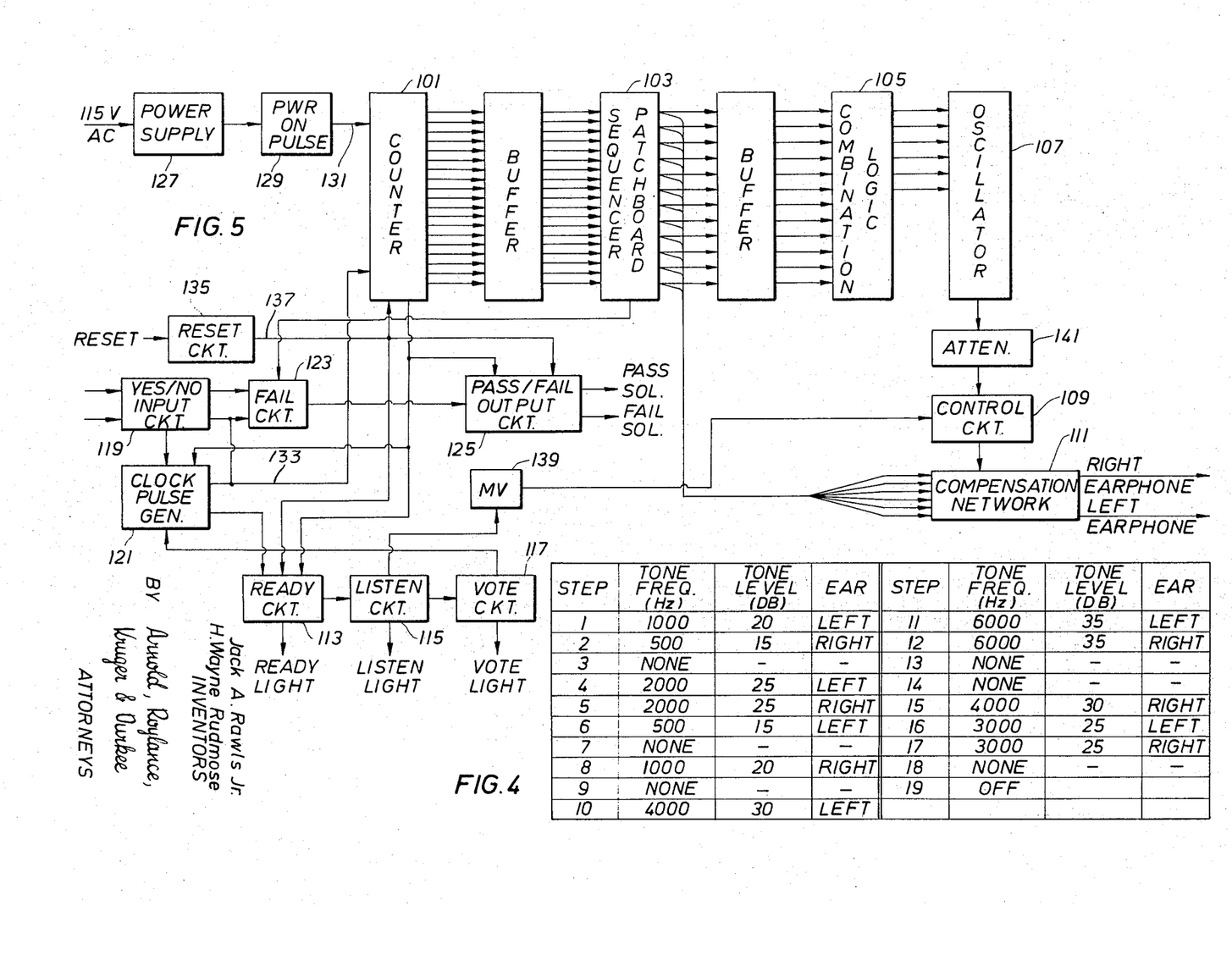
FIG. 4 is a typical sequence of individual tests for which the claimed invention may be preprogrammed to perform.
FIG. 5 is a block diagram of the electronic circuit of a preferred embodiment of the claimed invention.

Now turning to FIG. 4, a graph is shown showing a typical sequence of individual tests that may be programmed into the auditory screener. For example, the first individual test (identified as "step 1" on the chart shown in FIG. 4) produces a 1000 Hz. test tone in the left earphone at 20-db level, the second test produces a 500 Hz. test tone in the right ear at 15-db level and the third test does not produce a tone in either ear. The other tests similarly are initiated by the production of test tones at different frequencies for either the right or the left ear of the headphones and at various conditions of loudness or intensity levels.

A simplified block diagram of a preferred auditory screener suitably preprogrammed in accordance with the chart is shown in FIG. 5. Basically, the major components include counter 101, sequencer patchboard 103, combination logic circuit 105, oscillator 107, control circuit 109, compensation network 111, ready circuit 113, listen circuit 115, vote circuit 117, yes/no input circuit 119, clock pulse generator 121, fail circuit 123 and pass/fail output circuit 125.

With the application of power, normally 115 volts AC, to power supply 127, pulse circuit 129, connected to the power supply, produces a set pulse to counter 101 on line 131, thereby setting all of the outputs from the counter to "zero" (low value). At this time there is no clock pulse being applied from clock pulse generator on line 133.

To start the operation of the machine, a reset pulse is applied to reset circuit 135, derived by the insertion of a coin or other initiating mechanism. This initiating mechanism may include a coin triggered solenoid-operated mechanism, such as commonly employed in pay telephones. The reset pulse on line 137 changes the first flip-flop in counter 101 to "1," resets pass/fail output circuit 125, and changes ready circuit 113 to produce a "high" output (the output stage that activates or enables the following circuits).

At the end of the ready period, during the period that the READY light is on, the ready circuit output goes to low, which in turn raises the output of listen circuit 115 to high. When the listen circuit output is in the high condition, multivibrator 139 changes state to produce an enabling signal to control circuit 109.

When control circuit 109 is enabled an oscillator signal from 107 is applied through attenuator 141, circuit 109 and compensation network 111 to the proper earphone (for the first step, 1000 Hz. at 20-db to the left earphone). When the listen period is complete, the resulting low output from listen circuit 115 changes the state of control circuit 109, thereby removing the oscillator signal from the earphone.

As the output from listen circuit 115 goes to low, in addition to resetting multivibrator 139, a signal is applied to vote circuit 117 to produce a high output therefrom and initiating the vote period.

During the vote period, the subject undergoing test is expected to respond by pushing either the "YES" or "NO" button on the panel of the machine to produce either a yes or a no input signal to yes/no input circuit 119. As soon as a button is depressed, a signal is supplied from circuit 119 to produce from clock pulse generator circuit 121 a pulse to counter 101, which steps the high level output therefrom to the next flip-flop stage in the counter. That is, each time the subject responds, the counter steps to the next consecutive step.

If the subject does not respond during the vote period by depressing either the "YES" or the "NO" button, the vote circuit automatically supplies an input to the clock pulse generator circuit at the end of the vote period, this signal stepping the counter via the clock pulse generator and applying a "NO" vote input to fail circuit 123.

When the last step in the counter is voted upon, the counter will supply a voltage as a disenabling voltage to ready circuit 113, as a disenabling voltage to clock pulse generator circuit 121 to reduce its output to low and as an enabling voltage to pass/fail output circuit 125. This voltage from the counter holds the output of ready circuit 113 at low, prevents any clock pulse from being generated from clock pulse generator circuit 121 and enables pass/fail output circuit 125 so that its output will be applied to the appropriate pass or fail solenoid.

Which of the two outputs from pass/fail output circuit 125 that is produced for each subject tested is determined by how the subject has voted. As each vote selection is made, a yes or no input is supplied to fail circuit 123 from yes/no input circuit 119. At the same time a signal from sequencer patchboard 103 is supplied to fail circuit 123. If the signal from the sequencer patchboard and from the yes/no input circuit disagree or compare unfavorably, this is indicative of an incorrect response by the subject. Hence, an incorrect answer signal is applied to pass/fail output circuit 125. If any incorrect answer signal is received by pass/fail output circuit 125 during the entire series of individual test steps, the circuit is readied to deliver a signal to the fail solenoid upon enabling at the final vote. Otherwise, the circuit delivers a signal to the pass solenoid upon enabling at the final vote.

Figure 6:
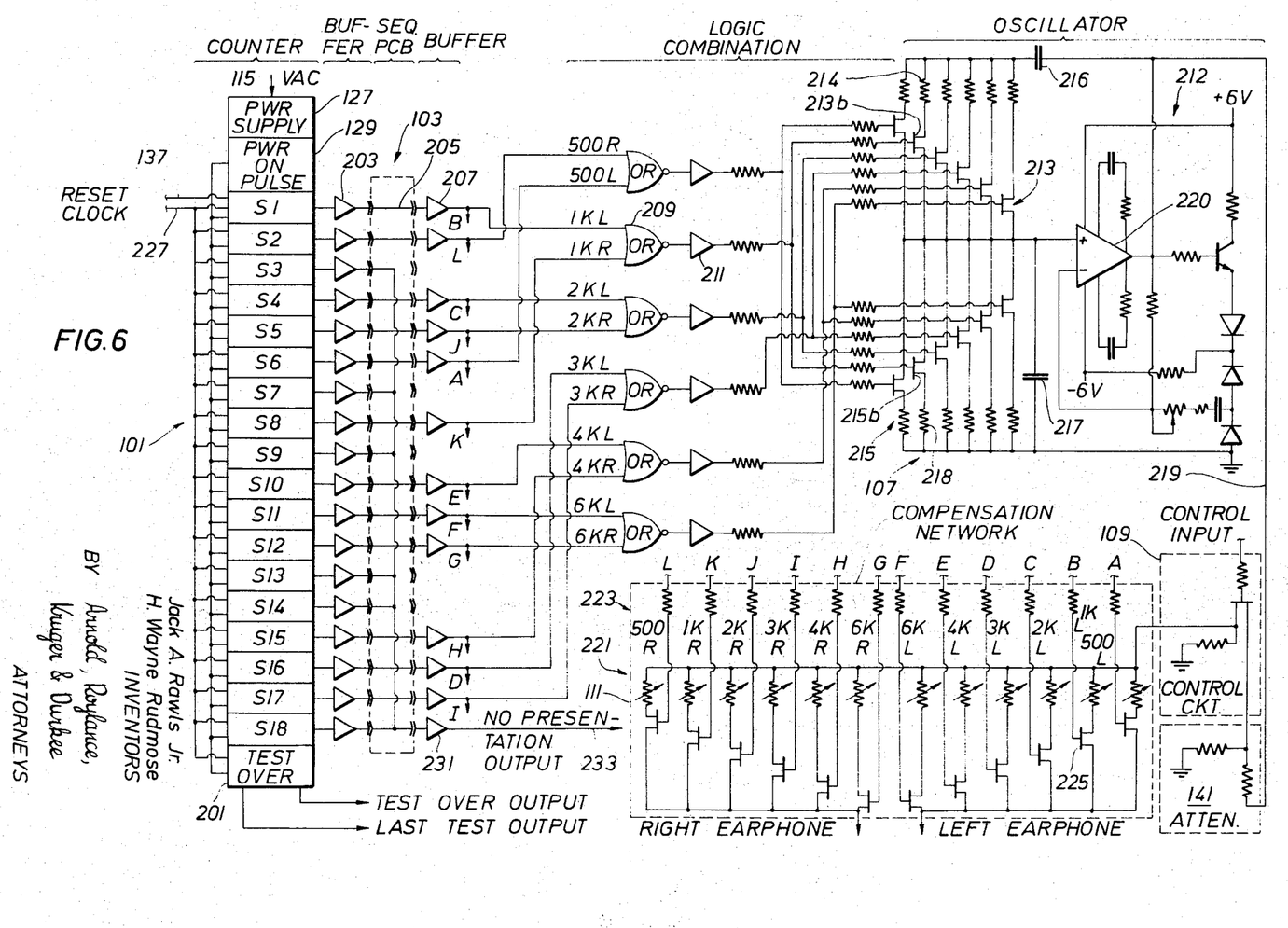
FIG. 6 is an expanded block diagram of a portion of the circuit shown in FIG. 5.
Figure 7:
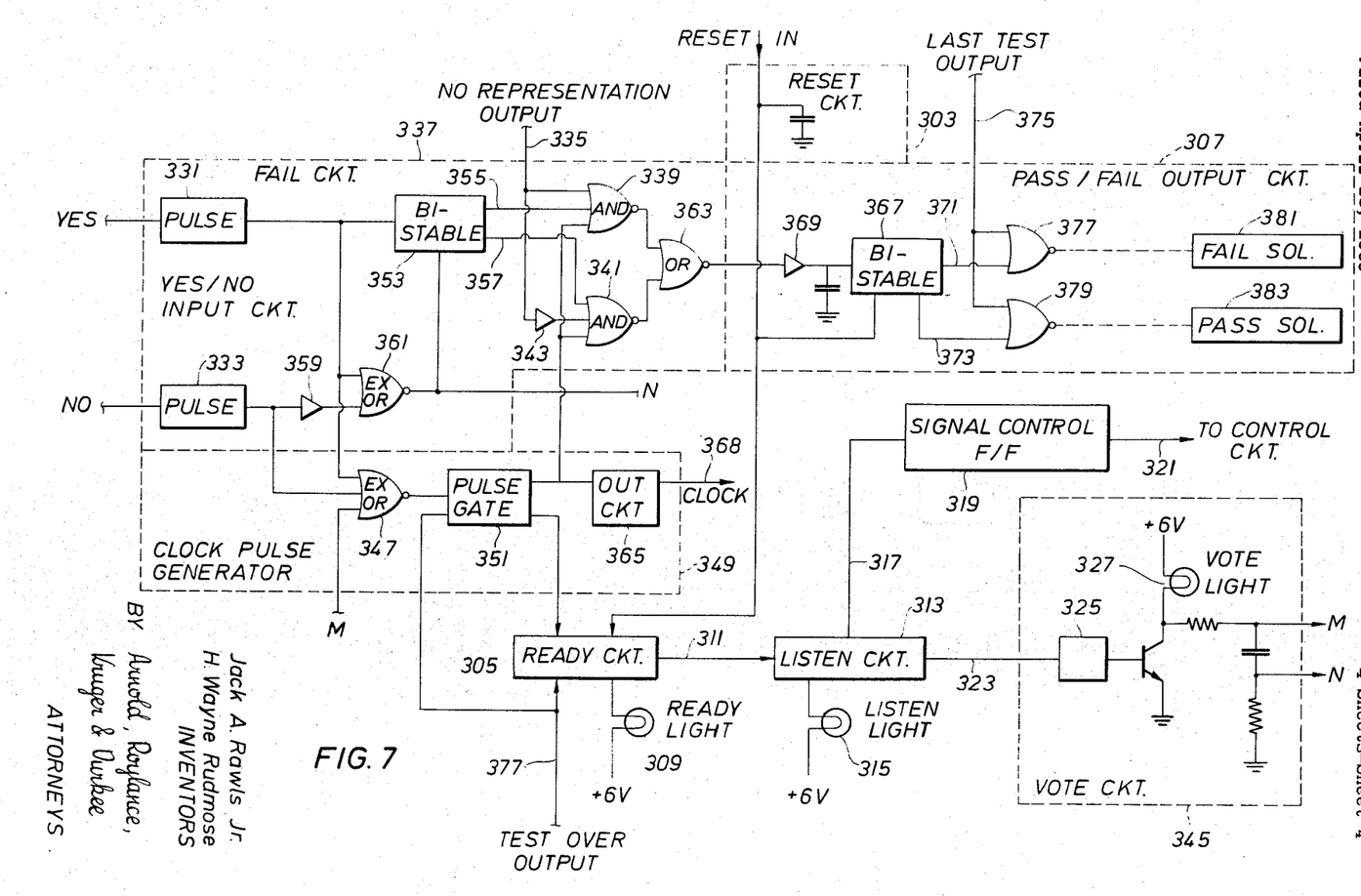
FIG. 7 is an expanded block diagram of another portion of the circuit shown in FIG. 5.

An understanding of the details of the individual circuits included in a preferred embodiment of the audio screener discussed above can be better understood by referring to the expanded block diagrams of FIGS. 6 and 7. FIG. 6 illustrates the circuitry that determines the frequencies of the tones, the levels of the tones and to which earphone each of the tones is applied. FIG. 7 illustrates that part of the circuitry which is subject controlled in response to the signals heard.

Now turning to FIG. 6, a power supply 127 of a conventional design for establishing the necessary voltage for operation of a transistor circuit, is connected to 115 AC line voltage. Typically, the power supply produces +6 volts DC, −6 volts DC and +3.6 volts DC. When line voltage is applied to power supply 127 a pulse develops from power on pulse circuit 129 connected thereto. Circuit 129 may be any convenient pulsing circuit suitable for setting all of the stages of counter 101. As illustrated, counter 101 is a 19-stage counter, the last stage of which produces control signals, rather than signals for initiating tones.

Pulse circuit 129 produces a set pulse to each of the bistable stages of counter 101 to establish the output from each stage at a logic "zero" or low value. To start the sequence of tests listed in the chart shown in FIG. 4, a reset pulse is applied on line 137 to change the first bistable stage S1 in counter 101 to logic "one" or to produce a high output logic value from this stage. The output from stage S1 is applied through buffer amplifier 203, through sequencer patchboard connection 205 through OR gate 209, through buffer amplifier 211, and finally to oscillator network 107.

Oscillator network 107 is a Wein bridge circuit of conventional design tuned in frequency by the selection of field effect transistors 213 and 215 (and the resistors respectively associated therewith) and capacitors 216 and 217.

When there is an output from amplifier 211 field effect transistors 213b and 215b are selected to produce a 1000 Hz. output on line 219. When this connection is made, capacitor 16, resistor 14 and field effect transistor 213b are included in the active circuit from the output of amplifier element 220 of the oscillator and the positive input terminal thereto. Resistor 218 and field effect transistor 215b in parallel with capacitor 217 are connected between ground and the positive input terminal of element 220.

Attenuator 141, which may merely be a resistor pad combination, and which provides an isolating function to prevent loading of the oscillator, receives the signal on line 219 and supplies its output to control circuit 109. Control circuit 109 may be any convenient form of gate, but, as illustrated, is a field effect transistor circuit.

The output of control circuit 109 is connected to compensation network 111, which comprises a group of separate field effect transistors (together with a level adjust variable resistor 221 and a fixed resistor 223 for each of the field effect transistors). In the compensation network, half of the outputs from the field effect transistors are connected for application to the left earphone and the other half are connected for application to the right earphone. The enabling signal for the selectable field effect transistor circuit, through which the applied oscillator tone is passed, is applied from a buffer amplifier. For the first test or step, the signal is supplied from buffer amplifier 207. In the case of the first stage signal, a signal is developed on the line marked "B" connected from buffer amplifier 207 to the circuit of field effect transistor 225. Hence, transistor 225 is enabled for passing the 1000 Hz. tone at 20-db to the left earphone.

The application of clock signal on line 227 connected to each of the stages of the counter steps the counter to raise the output of stage S2 to high and to return the output of stage S1 to low. A similar procdure to that just described is repeated for this second output, resulting during this second test in a 500 Hz. signal being applied to the right earphone at a level of 15-db.

During the third test, there is no output from sequencer patchboard 103 except through buffer amplifier 231 to line 233 ("no presentation output"). Although this output does help determine the operation of the subject-controlled portion of the circuit, which will be discussed later, there is no initiation of an appropriate signal for application to an earphone.

The test steps repeat in the described manner until each of the individual tests have been performed in accordance with the chart shown in FIG. 4. At the last step appropriate complementary outputs "test over output" and "last test output" are developed. At the time the overall test is over. A new reset pulse is necessary before the test series is repeated (presumably for the next subject to be tested).

FIG. 7 shows the subject-control portion of the overall auditory screener. As previously mentioned with the insertion of the coin or other initial triggering mechanism a pulse is applied on "reset in" line 301, which pulse is shaped somewhat by the capacitor in reset circuit 303. The applied pulse from the reset circuit is connected to ready circuit 305 and to pass/fail circuit 307 (as well as counter 101 described above).

Ready circuit 305 may be merely a monostable circuit which has a fairly long delay period between being set to the high output state and the time it returns to its low state condition. The pulse from the reset circuit establishes the high output condition. A ready light 309 connected to this circuit is lit to indicate that the ready circuit is in its high condition. The period while the ready light is lit may be referred to as the "ready period."

At the completion of the ready period ready light 309 goes out and an output is produced on line 311 to place listen circuit 313 to have a high output condition, and to thereby light listen light 315 connected thereto. The period during which the listen circuit is in its high output condition is referred to as the "listen period." The output on line 317 from listen circuit 313 goes from a low output to a high output at the initiation of the listen period. This changes the state of signal control circuit 319, which may merely be a bistable multivibrator. When this happens, the output from signal control circuit 319 on line 321 enables control circuit 109 (FIG. 5) so that the selected oscillator tone is applied to the appropriate earphone.

When the listen period is complete, the output voltage applied to signal control circuit 319 on line 317 is restored to its original condition, thereby returning circuit 319 to its original state and disenabling control circuit 109 via the signal on line 321.

The output from listen circuit 313 on line 323 occurring at the end of the listen period activates multivibrator 325, lighting light 327 and initiating the "vote period." The subject has been previously instructed to press the "YES" or "NO" button on the console when the "VOTE" light comes on. Therefore, when either the "YES" or "NO" button on the panel console is pressed, either pulse circuit 331 or 333, respectively, is activated. These pulse circuits are merely pulse shaping circuits for supplying an appropriate trigger signal to the subsequent circuits which are connected thereto.

It should be remembered that if any tone has been applied to an earphone and the subject votes "YES," this is a correct answer. If there is no presentation and the subject says "YES," this is an incorrect answer. If there is a tone applied to an earphone and subject votes "NO," this is an incorrect answer. If there is no presentation and the subject votes "NO," this is a correct answer. Finally, if the subject does not vote at all, it is assumed that he has not heard anything and a "NO" vote is recorded.

With this in mind, it should be noted that a high "no presentation output" signal on line 335 is applied when there is no tone to fail circuit 337, and specifically to AND gate 339 and to AND gate 341 through inverting amplifier 343. Otherwise, the "no presentation output" signal on line 335 remains low.

At the initiation of the vote period, there is an output M from vote circuit 345 applied to exclusive OR gate 347 in clock pulse generator 349. Since this is the only signal being applied through gate 347, pulse gate circuit 351 connected thereto receives an input, which causes an enabling signal to be applied to AND gates 339 and 341 of fail circuit 337.

Assume that there has been an input signal applied to an earphone (low signal on line 335). Assume also that the subject properly votes "YES," thereby producing a signal from pulse circuit 331. This signal produces from bistable circuit 353 connected to pulse circuit 331 an output on line 335 connected to AND gate 339 in fail circuit 337. There is a low input on line 335, however, so there is no output from gate 339. The complementary output from bistable circuit 353 on line 357 is in a low condition and therefore prevents gate 341 from producing an output. The net result is that the fail circuit does not produce an output.

On the other hand, assume that an incorrect response is initiated by the subject, or an output pulse is produced from pulse circuit 333. This produces, through inverter 359 connected thereto, an output from exclusive OR circuit 361 (the other connection of which is to pulse circuit 331). Hence, the state of bistable circuit 353 is changed. When bistable circuit 353 is changed, a high output is produced on line 357 and a low output is produced on line 355. The low output on 355 prevents AND gate 339 from producing an output. However, since the low output on 335 is inverted to be a high output by inverter 343, all three inputs (from 343, from 351 and from 353) are present for producing an output gate 331. This output is produced through OR gate 363 connected to gates 339 and 341 to be stored in pass/fail output circuit 307, which will be described.

It will be noted that a high "no presentation output" on line 335 and a "yes" vote on line 353 will likewise produce a signal gating on OR gate 363. All other possible incorrect answers produce a fail signal from OR gate 363 and all correct answers will not produce a signal from OR gate 363.

Should no vote be indicated by the subject during the vote period, a delayed output from vote circuit on line "N" is produced, which is applied to bistable circuit 353 in the same manner as a "NO" vote would be applied thereto.

As soon as a response is made, a disenabling signal is applied either from yes pulse circuit 331 or no pulse circuit 333 to exclusive OR gate 347, thereby turning this gate off and producing through pulse gate 351 and out circuit 365 a suitable clock pulse on line 368 (for application as a signal on line 227 to counter 101). If no vote is recorded, the same effect occurs by the "M" output from vote circuit 345 returning to a low value.

Now turning to pass/fail output circuit 307, it will be seen that the bistable circuit 367 therein is reset by application of the signal from reset circuit 303. When a signal from fail circuit is applied from OR gate 363 through buffer amplifier 369, a high output is produced from bistable circuit 367 on line 371. If no output on the entire series of tests is produced from OR gate 363, then a high output is produced from bistable circuit 367 on line 373 (the complementary output to the output on line 371). When the whole sequence of tests has been completed and an enabling output is produced on line 375, this output being identified as the "last test output," either gate 377 or 379 produces a signal which will activate either fail solenoid 381 or pass solenoid 383, respectively.

At the same time that the "last test output" signal is produced on line 375 a "test over output" signal is produced on line 377 to disenable ready circuit 305 and pulse gate 351 within clock pulse generator 349 until such time as a reset in signal is received on line 301.

Although oscillator 107 illustrated in the preferred embodiment is a Wein bridge selectably tunable by the operation of selectably operated field effect transistors, it is possible to have a plurality of individual oscillators each operating at a different frequency. Also the attenuators, adjustable in the preferred embodiment to produce tone levels at 15-db, 20-db, 25-db, 30-db and 35-db, may be set to produce levels as desired.

Although the screener above described would apply a signal to the fail solenoid if only one of the individual tests is responded to incorrectly by the examined subject, a counter (not shown) may be included between OR gate 363 and amplifier 369 so that the subject would have to fail a preset number of individual test steps before the fail-actuator device would be activated.

Incidentally, a fail-actuator device which may be used would merely include a solenoid acting on a mechanical lever arrangement for deflecting the coin used to initiate the test. When the test is completed, and either the pass or fail solenoid is actuated, the coin is released. If the mechanical lever arrangement has been actuated by fail solenoid 381, the coin is deposited in "fail" compartment 27 (FIG. 3). Otherwise the coin is deposited in "pass" compartment 25.

The pass-actuator and fail-actuator devices may take many other forms, commonly used in the art. For instance, the actuators may mark, such as by slot punching, respective "pass" and "fail" columns in an IBM-type card, the actuators or the card being indexed for the eighteen individual test steps. Such a punched card would show not only how many wrong answers the tested person's responses produced, but from a knowledge of the programmed sequence of the test tones, it would be readily possible to correlate the results to reveal in what range hearing loss was indicated. In fact, such correlation may be included through direct printing on the card the nature of each individual test tone.

Modification to the test routine and to any particular device made in accordance with this invention can be employed in many specific areas. For example, the number of presentations included in the preferred embodiment is shown as being eighteen. In an actual machine device, this number may be different or varied, the number of test tone oscillators may be varied (or one oscillator may be made tunable to produce more or less frequencies than six), the degree of attenuation may be varied, test tones may be simultaneously applied to both the left and right earphones, a greater or lesser number of no-signal occurrences may be selected and the preset number of incorrect answers to produce an output from the fail-actuator device may be varied in accordance with the purpose of the screening examination.

The recording means when it is a punched card, tape, etc., may be indexed by an output from any of the signals that occur once each test tone cycle, such as the output from vote multivibrator 85. If desired, a repeat circuit may be employed to allow the examined subject to listen again to any particular test step.

Although the device has been assumed to be comprised of solid state devices, electromechanical devices may be employed, as well. For instance, counter 101 could employ a solenoid-operated rotary switch for sequentially selecting the individual test steps.

Plastic chips, the unpunched IBM-type card (when used) or other starting means could be employed instead of coins.

Although the device visualized in the preferred embodiment is a single packaged unit, is is possible to separate the recording means (e.g., a punched card system, a paper tape with an ink scriber system, magnetic tape system, etc.) from the test-giving device and remotely locate it. Also, a central computer may be used for recording the pre-programmed test sequence, individual consoles interrogating the computer memory device in accordance with the respective tests being conducted at the individual consoles. Finally, data processing techniques may be employed to evaluate the recorded data, as desired.

While multiple embodiments of the invention have been described, it is obvious that various additional substitutions or modifications of structure may be made without varying from the scope of the invention.

What is claimed is:

1. A device for testing the hearing of a person, comprising
at least one auditory transducer for producing audible tones over a spectrum of the normal auditory range in response to corresponding electrical signal,
logic means connected to the input of said auditory transducer,
signal means for producing a plurality of electrical signals having frequencies within the normal auditory range connected to said logic means, preprogrammed means connected to said signal means for selectively applying in programmed order individual ones of the plurality of electrical signals to said logic means interspaced with pre-programmed occurrences where none of the plurality of electrical signals are selected, time control means connected to said logic means for allowing the selected individual ones of the plurality of electrical signals applied to said logic means to produce corresponding audible for controlled time intervals, thereby establishing the successive tone condition of said auditory transducer, and two-position vote means operably connected to said preprogrammed means and operated by the person whose hearing is being tested following each of said controlled time intervals to produce a pass signal when said vote means is operated to properly indicate the tone occurrences of said auditory transducer and to produce a fail signal when said vote means is operated to falsely indicate the tone occurrence of said transducer.

2. A device for testing the hearing of a person as described in claim 1, wherein said preprogrammed means is a multistage counter, each of said stages receiving input signals from its successor stage and from said two-position vote means.

3. A device for testing the hearing of a person as described in claim 1, wherein said time control means includes
time interval means for enabling said logic means for a standard interval of time, and
means operably connected to initiate the operation of said time interval means, delay-operated by said two-position vote means.

4. A device for testing the hearing of a person as described in claim 3, and wherein said means operably connected to said time interval means includes
second time interval means with its input connected to said two-position vote means and with its output connected to determine the delay operation of said time interval means.

5. A device for testing the hearing of a person as described in claim 3, wherein said preprogrammed means is a multistage counter, each of said stages receiving its input pulse from its successor stage and from said two-position vote means.

6. A device for testing the hearing of a person as described in claim 1, wherein
said preprogrammed means produces a signal when none of the plurality of electrical signals is selected,
said two-position vote means includes
"Yes" vote selected means for producing a pulse upon selection,
"No" vote select means for producing a pulse upon selection,
"Fail" vote gate means operable when said signal from said preprogrammed means and the signal from said "Yes" vote select means occur simultaneously and when said signal from said "No" vote select means occurs without a signal being present from said preprogrammed means,
"Pass" vote gate means operable when said signal from said preprogrammed means and the signal from said "No" vote select means occur simultaneously and when said signal from said "Yes" vote select means occurs without a signal being present from said preprogrammed means.

7. A device for testing the hearing of a person as described in claim 6, and including a time interval means for supplying a signal comparable to said pulse produced by said "No" vote select means when neither "Yes" vote select means nor said "No" vote select means is selected within a preset period of time following the selection or nonselection of each of said plurality of electrical signals by said preprogrammed means.

8. A device for testing the hearing of a person as described in claim 6, and including record means connected to said "Pass" vote gate means and said "Fail" vote gate means for permanently recording the results from a series of operations of said two-position vote means.

9. A device for testing the hearing of a person, comprising
a first auditory transducer for producing audible tones over a spectrum of normal auditory range in response to corresponding electrical signals to the left ear of the person whose hearing is being tested,
a second auditory transducer for producing audible tones over a spectrum of normal auditory range in response to corresponding electrical signals to the right ear of the person whose hearing is being tested,
first logic means connected to the input of said first auditory transducer,
second means connected to the input of said second auditory transducer,
signal means for producing a plurality of electrical signals having frequencies within the normal auditory range connected to said first and second logic means,
programmed means connected to said signal means for selectively applying in programmed order individual ones of the plurality of electrical signals to said first and second logic means interspaced with programmed occurrences where none of the plurality of electrical signals is selected,
time control means connected to said logic means for allowing the selected individual ones of the plurality of electrical signals applied to said logic means to produce corresponding audible tones for controlled time intervals, thereby establishing the successive tone condition of said auditory transducer, and
two-position vote means operably connected to said programmed means and operated by the person whose hearing is being tested following each of the controlled time intervals to produce a "Pass" signal when said vote means is operated to properly indicate the tone occurrence of said auditory transducer and to produce a "Fail" signal when said vote means is operated to falsely indicate the tone occurrence of said transducer.

10. A device for testing the hearing of a person, comprising
at least one auditory transducer for producing audible tones over a spectrum of the normal auditory range in response to corresponding electrical signals,
sequentially operated bistable elements for initiating each test step occurrence,
signal means for producing a plurality of electrical signals having frequencies within the normal auditory range,
logic means operably connected to said bistable elements and programmed to selectively apply in programmed order individual ones of the plurality of electrical signals from said signal means to said auditory transducer interspaced with occurrences where none of the plurality of electrical signals are selected,
time controlled logic means connected to said logic means for allowing the selected individual ones of the plurality of electrical signals from said signal means to produce corresponding tones for controlled time intervals, thereby establishing the successive tone conditions of said auditory transducer, and two-position vote means operably connected to said logic means and operated by person whose hearing is being tested following each of said controlled time intervals to produce a pass signal when said vote means is operated to properly indicate the tone occurrence of said auditory transducer and to produce a fail signal when said vote means is operated to falsely indicate the tone occurrence of said transducer, said vote means providing a step enabling signal to said bistable elements.

11. A device for testing the hearing of a person as described in claim 10, wherein said signal means for producing a plurality of electrical signals includes
    a Wein bridge oscillator selectably tunable by a plurality of field effect transistor networks, selectable pairs of which are operably connected to said bistable elements of said logic means in programmed order.

No references cited.

KATHLEEN H. CLAFFY, Primary Examiner

C. W. JIRAUCH, Assistant Examiner

UNITED STATES PATENT OFFICE
CERTIFICATE OF CORRECTION

Patent No. 3,536,835                              Dated October 27, 1970

Inventor(s) Jack A. Rawls, Jr. and H. Wayne Rudmose

It is certified that error appears in the above-identified patent and that said Letters Patent are hereby corrected as shown below:

Col. 2, line 50, "th" should read --the--. Col. 3, lines 33 and 34, "enjection" should read --ejection--; line 57, "above-described" should read --above-recited--. Col. 7, line 57, "procdure" should read --procedure--. Col. 8, line 73, "335" should read --355--. Col. 11, line 12, after "audible" should be inserted --tones--. Col. 12, line 22, after "second" first occurrence should be inserted --logic--. Col. 13, line 2, after "by" should be inserted --the--.

SIGNED AND
SEALED
DEC 29 1970

(SEAL)
Attest:

Edward M. Fletcher, Jr.
Attesting Officer

WILLIAM E. SCHUYLER, JR.
Commissioner of Patents